(12) United States Patent
Malik et al.

(10) Patent No.: US 9,618,047 B2
(45) Date of Patent: Apr. 11, 2017

(54) BEARING SUPPORT POINT WITH AT LEAST ONE AXIAL BEARING

(71) Applicant: Schaeffler Technologies AG & Co. KG, Herzogenaurach (DE)

(72) Inventors: Reinhart Malik, Herzogenaurach (DE); Martin Gegner, Langenfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/747,650

(22) Filed: Jun. 23, 2015

(65) Prior Publication Data

US 2015/0369292 A1    Dec. 24, 2015

(30) Foreign Application Priority Data

Jun. 24, 2014   (DE) .................. 10 2014 212 030

(51) Int. Cl.
| | | |
|---|---|---|
| *F16C 35/06* | (2006.01) | |
| *F16C 19/30* | (2006.01) | |
| *F16C 35/07* | (2006.01) | |
| *F16C 33/58* | (2006.01) | |

(52) U.S. Cl.
CPC .............. *F16C 35/06* (2013.01); *F16C 19/30* (2013.01); *F16C 33/58* (2013.01); *F16C 35/07* (2013.01)

(58) Field of Classification Search
CPC .......... F16C 19/10; F16C 19/12; F16C 19/30; F16C 19/305; F16C 19/32; F16C 19/44; F16C 19/46; F16C 19/463; F16C 19/466; F16C 19/48; F16C 19/54; F16C 35/067; F16C 35/07; F16C 35/077; F16C 33/58
See application file for complete search history.

(56) References Cited

U.S. PATENT DOCUMENTS

| | | | | |
|---|---|---|---|---|
| 961,140 A | * | 6/1910 | Ketchum ................ | F16C 19/30 384/608 |
| 3,277,988 A | * | 10/1966 | Pitner ..................... | F16C 19/30 192/110 B |
| 3,317,014 A | * | 5/1967 | Pitner ..................... | F16C 19/30 192/98 |

(Continued)

FOREIGN PATENT DOCUMENTS

| | | |
|---|---|---|
| DE | 000001195558 B | 6/1965 |
| DE | 000007139001 U | 1/1972 |

(Continued)

OTHER PUBLICATIONS

Machine Translation of JP 2006-143071 dated Jun. 8, 2006.*

*Primary Examiner* — Alan B Waits

(74) *Attorney, Agent, or Firm* — Simpson & Simpson, PLLC

(57) ABSTRACT

A bearing support point with at least one axial bearing, in which at least one bearing washer of the axial bearing is held at a structural element, with the bearing washer being formed separately from the structural element and comprising at least one axially aligned track for the axial bearing as well as being fastened at the structural element such that the bearing washer is inserted in an opening of the structural element and is encompassed by the structural element at least at an exterior area and with the bearing washer being supported via the area inside the opening, aligned in the radial direction.

10 Claims, 2 Drawing Sheets

(56) References Cited

U.S. PATENT DOCUMENTS

| | | | | |
|---|---|---|---|---|
| 3,912,347 | A * | 10/1975 | Pflugner | F16C 35/067 384/585 |
| 3,981,060 | A * | 9/1976 | Alling | B21D 53/10 29/898.041 |
| 4,166,662 | A * | 9/1979 | Chiba | F16C 19/30 384/622 |
| 4,225,200 | A * | 9/1980 | Dougall | F16C 19/30 206/318 |
| 4,526,336 | A * | 7/1985 | Durivault | A47B 81/065 248/349.1 |
| 5,489,255 | A * | 2/1996 | Hinckley | F16C 19/30 384/620 |
| 5,846,000 | A * | 12/1998 | Tanishiki | F01C 17/063 384/618 |
| 5,967,674 | A * | 10/1999 | Reubelt | F16C 19/30 384/620 |
| 6,830,381 | B2 * | 12/2004 | Schwab | F16C 19/30 384/620 |
| 6,857,787 | B1 * | 2/2005 | Meier | F16C 19/10 384/619 |
| 6,945,700 | B2 * | 9/2005 | Fugel | F16C 19/30 384/620 |
| 7,578,764 | B2 * | 8/2009 | Brown | F16C 19/30 384/622 |
| 8,607,948 | B2 | 12/2013 | Sturgin et al. | |
| 9,080,607 | B2 * | 7/2015 | Gooden | F16C 33/586 |
| 2005/0187060 | A1 | 8/2005 | Bauknecht et al. | |
| 2006/0140527 | A1 * | 6/2006 | Takamizawa | F16C 19/30 384/620 |
| 2008/0277228 | A1 | 11/2008 | George | |
| 2013/0223786 | A1 | 8/2013 | Fugel et al. | |
| 2014/0150622 | A1 * | 6/2014 | Wen | B23D 45/10 83/838 |

FOREIGN PATENT DOCUMENTS

| | | | |
|---|---|---|---|
| DE | 000002044074 A | 3/1972 | |
| DE | 2431423 A1 * | 1/1976 | F16C 19/30 |
| DE | 000010130458 A1 | 9/2002 | |
| DE | 102010001136 A1 * | 7/2011 | F16C 19/466 |
| DE | 112011100816 T5 | 2/2013 | |
| DE | 102012223882 A1 * | 6/2014 | F16C 33/6677 |
| EP | 000000860626 A2 | 8/1998 | |
| GB | 1360438 A * | 7/1974 | B21B 31/07 |
| JP | 002005098409 A | 4/2005 | |
| JP | 002006143071 A | 6/2006 | |

* cited by examiner

BEARING SUPPORT POINT WITH AT LEAST ONE AXIAL BEARING

CROSS-REFERENCE TO RELATED APPLICATIONS

The present application claims priority under 35 U.S.C. §119 to German Patent Application No. DE 10 2014 212 030.6, filed on Jun. 24, 2014, which application is incorporated herein by reference in its entirety.

FIELD OF THE INVENTION

The invention relates to a bearing support point with at least one axial bearing, in which at least one bearing washer of the axial bearing is held at a structural element, with the bearing washer being embodied separately from the structural element and comprising at least one axially aligned running track for the axial bearing, and being fastened at the structural element.

BACKGROUND OF THE INVENTION

In certain applications, for example, in automatic transmissions for motor vehicles, planetary gears are used with clutch carriers or other structural elements, which are axially supported at two sides. The unhardened structural element made from steel or other metallic alloys is here surrounded at both sides by annealed bearing washers made from steel, with axial roller bearings, particularly needle bearings, contacting it. United States Patent Application Publication No. 2005/0187060 A1 (Bauknecht et al.) shows an example of such an arrangement. Here, a separate bearing washer is provided for each of the axial bearings arranged at the left and the right side of the structural element.

Such bearing support points require a large axial construction space.

Typically, axial bearing support points act unilaterally, the bearing washer respectively axially abuts the structural element and the axial bearing axially abuts the bearing washer. The bearing washer is also called axial washer. This way, the axial width of the bearing support point represents the sum of the axial width of the structural element at said bearing support point, plus the axial width of the bearing washer, and additionally the diameter of a roller body of the axial bearing.

In typical axial bearing support points, acting dual-sided, a bearing washer respectively rests axially at the right and the left side on the structural element. Additionally, one axial bearing abuts each of these bearing washers. This way, the axial width of the bearing support point represents a sum of the axial width of the structural element, plus the axial width of the bearing washer at the left side, plus the axial width of the bearing washer at the right side, and plus the diameter of a roller body of the axial bearing at the left side, and also plus the diameter of a roller body of the axial bearing at the right side.

BRIEF SUMMARY OF THE INVENTION

The invention broadly comprises a bearing support point with at least one axial bearing, in which at least one bearing washer of the axial bearing is held at the structural element, with the bearing washer being formed separately from the structural element and at least comprising one axially aligned track for the axial bearing, as well as it being fastened at the structural element such that the bearing washer being inserted in an opening of the structural element and the structural element encasing from the outside at least an exterior area and with the bearing washer being supported via the area inside the opening in a radially aligned fashion.

The invention broadly comprises a bearing support point with at least one axial bearing including a structural element having an opening and at least one bearing washer formed separately from the structural element and fastened at the structural element, the at least one bearing washer comprising an axially aligned track for the at least one axial bearing. The bearing washer is inserted in the opening of the structural element such that the structural element encases from the outside at least an exterior area of the at least one bearing washer and the bearing washer is supported via the exterior area inside the opening in a radially aligned fashion.

The objective of the invention is to provide a bearing support point, which axially requires only a small construction space, is embodied in a simple fashion, and can be produced in a cost-effective manner.

According to the invention, the bearing washer is fastened at the structural element such that the bearing washer is inserted in an opening of the structural element and is encompassed at its exterior by said structural element, at least at an external area, and is internally supported via this area in the opening in a radially directed fashion, and is axially fastened. At the exterior, the bearing washer shows preferably the shape of a cylinder, so that the exterior area forms an outer cylindrical area. Accordingly, the internal area of the opening, into which the bearing washer is inserted, is preferably cylindrical towards the inside. Here, radially refers to a direction aligned perpendicular to the axis of rotation of the axial bearing.

One embodiment of the invention provides that the bearing support point is provided with two axial bearings. The axial bearings are located axially opposite each other at axially facing tracks of the bearing washer and are each axially supported at one of the tracks. Here, axial refers to being aligned like the axis of rotation of the axial bearing.

According to the invention the bearing washer is inserted in the structural element such that the axial width of the bearing support point only results from the axial width of the bearing washer plus the diameter of one of the roller bodies. Overall, the bearing support point according to the invention is advantageously narrower by the axial width of the structural element at the bearing support point compared to typical bearing support points known. The axial width of the bearing washer is equivalent to its thickness. The width of the structural element is equivalent to the thickness of a housing, carrier, or clutch element, by which the respective structural element is formed.

According to the inventive solution, the bearing support point now only shows one bearing washer, which is inserted in the structural element. The axial bearing support point, acting dual-sided according to the invention, is therefore advantageously narrower than typical bearing support points by the dimension developing from the sum of the width of one of the bearing washers and the width of the structural element at the bearing support point.

One embodiment of the invention provides that the surface hardness of the material of the bearing washer is at least at the track greater than the surface hardness of the material shown by the structural element, at least at the opening. This results in additional advantages of the invention, according to which in the bearing support point the structural element may be formed from a different material than the bearing support point itself. For example, the material of the structural element is a different steel than the one forming the bearing washer. Alternatively, the structural element and the bearing washer are both made from the same steel. In this case, the bearing washer is however hardened at least at the tracks for the axial bearings and those of the structural elements, without this being mandatory, though. Alternatively, the structural element is formed, e.g., from a light-metal alloy, and the bearing washer from annealed steel. Due to the fact that the structural element is frequently very large, the advantage develops particularly by the fact that the material quality, processing quality, and hardness of the structural element is not dependent on the frequently higher requirements for the quality of the bearing washer, particularly the requirements for hardness and precision of processing. The components may both be produced independently from each other and in spite thereof may form a narrow unit, which is equivalent to the axial width of the structural element only.

The latter is particularly advantageous when the structural element, such as provided in one embodiment of the invention, shows an axial width at least at the opening in which the bearing washer is supported radially in the structural element, which is smaller than the width of the structural element following the opening. The advantage comprises that the width of the bearing washer is only dependent on the requirements for its stability and life expectancy, but not on the thickness of the structural element. Finally, the structural element and the bearing washer both show the same axial width, at least at the opening. However, in the bearing support point according to the invention the axial bearing washer may also be wider than the structural element at the opening. This is the case, for example, when the structural element is made from a thin sheet metal, e.g., spring steel, or is embodied as a disk.

The bearing washer is radially supported in the opening and axially fastened at the structural element. Alternatively, the structural element is fastened axially at the bearing washer. For this purpose, one embodiment of the invention provides that the structural element and the bearing washer are axially connected to each other via at least one material-to-material connection. For this purpose, protrusions of the structural element penetrate axial openings in the bearing washer. The protrusions are plastically deformed at the ends such that these plastic deformations axially engage behind the edges of the openings. The structural element is this way connected to the bearing washer, e.g., by a clinch connection. During clinching, which is also called clinch riveting, the bearing washer and the respective section of the structural element are pressed into the matrix by a plunger and here plastically deformed. A form-fitting and force-fitting connection develops.

Alternatively, one embodiment of the invention provides that the structural element is connected to the bearing washer by at least one rivet. Due to the fact that the bearing washer is inserted in an opening of the structural element, any radial overlap of the bearing washer with the structural element is missing, which is necessary for a rivet connection. Instead of the overlap, here it is provided that the rivet connection is formed by a rivet and by a penetrating hole, with a part of the penetrating hole being internally limited by the structural element and another part of the penetrating hole internally by the bearing washer. The respective rivet is therefore located in a penetrating hole, half of which being limited by the structural element and the other half by the bearing washer, namely, at a location at which the edge of the opening in the structural element and the exterior edge of the bearing washer are located radially opposite each other. Both the structural element and the bearing washer are engaged by means of a rivet head at the right and a rivet head at the left side of the bearing washer in a same radial plane, respectively. In spite of the missing overlap of the two structural parts, with such a bearing support point advantageously the proven and generally cost-effectively produced rivet connection can be used. Such an arrangement can avoid the overlap of the structural parts, which is necessary in typical bearing support points, in spite of using such a rivet connection. The axial construction space is advantageously reduced.

In case that during operation of the vehicle transmission about the axis of rotation high torque must be transferred between the structural element and the bearing washer about the axis of rotation, one embodiment provides form-fitting connections between the structural element and the bearing washer. These form-fitting connections are embodied by radial protrusions, which are distributed in the circumferential direction about the axes of rotation of the axial bearings and/or the shaft. The protrusions project radially towards the outside out of the bearing washer and/or radially towards the inside out of the bearing element and engage appropriate recesses in the structural element/the bearing washer. In particular, this is very effective in the cooperation with the above-described rivet connection.

The axial bearing is embodied as an axial needle bearing, so that the roller bodies represent needles. Compared to rollers, needles show a greater length-diameter ratio, which in rollers is smaller and in needles is greater than the numeric value 2.5. The rollers or needles are each guided in cages and form the so-called roller rings or needle rings.

One embodiment of the invention provides for a radial guide of the bearing washer at/on a shaft.

Alternatively, an inner and/or outer flange is provided for radial guidance. Another embodiment of the invention provides that the bearing washer and the axial bearing are fastened to each other in a self-retaining fashion. One example of a structural element of the invention is a clutch carrier of a planetary gear.

BRIEF DESCRIPTION OF THE SEVERAL VIEWS OF THE DRAWINGS

Exemplary embodiments of the invention are explained based on the drawings. The drawings are schematic illustrations. The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIGS. 1 to 5 respectively show a detail of one exemplary embodiment of bearing support point 1, 2, 3, 4, or 5 according to the invention. The details are shown in a longitudinal cross-section along the respective axis of rotation 6 of axial bearings 9 and 10.

Figure 1:
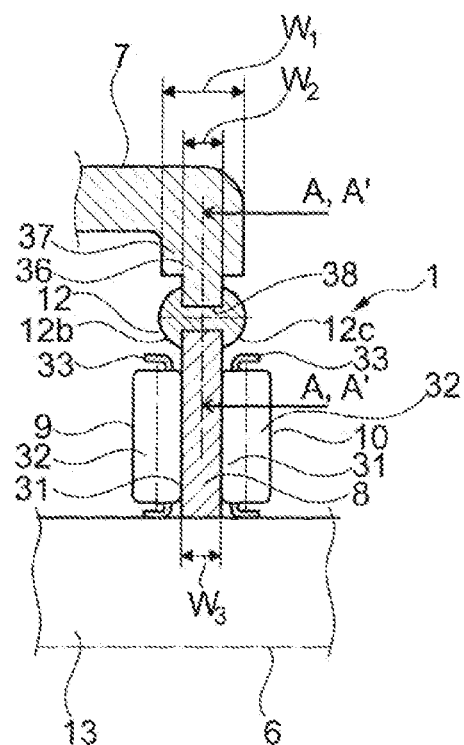
FIG. 1 is a detail of one exemplary embodiment of a bearing support point.
Figure 6:
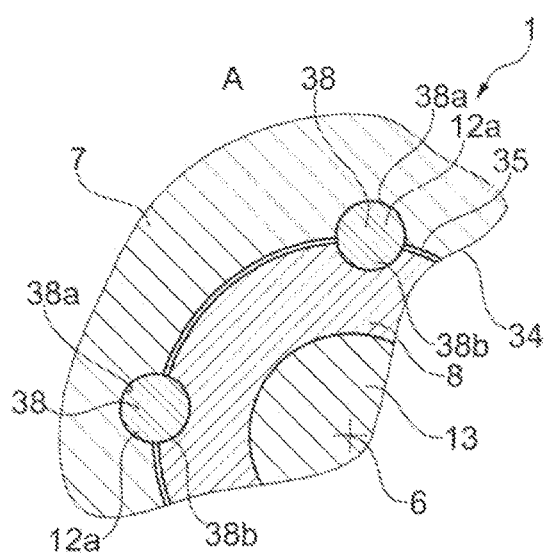
FIG. 6 is a cross-sectional detail view taken generally along line A and/or A' in FIG. 1; and, FIG. 7 is a cross-sectional detail view taken generally along line A and/or A' in FIG. 1
Figure 7:
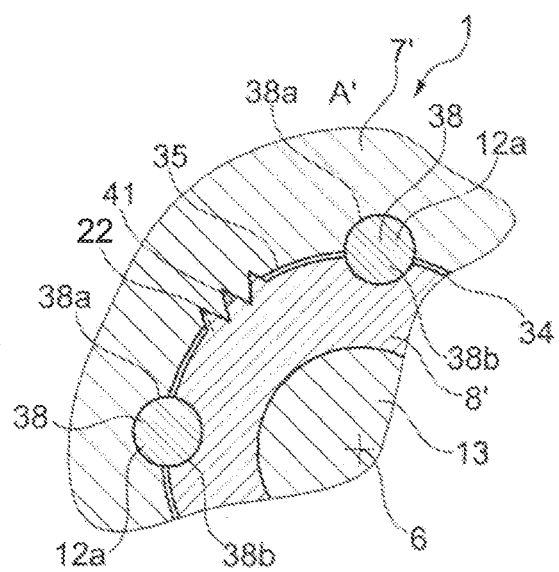

FIGS. 6 and 7 each show, based on the example of bearing support point 1 of FIG. 1, a detail in a cross-section along the line A and/or A', not to scale.

FIG. 1 shows bearing support point 1 with two axial bearings 9 and 10, structural element 7, and bearing washer 8. Bearing washer 8, embodied separately and like a punched disk, is held at structural element 7. Bearing washer 8 is provided with two tracks 31, axially facing away from each other. Axial bearings 9 and 10 are positioned axially opposite each other at bearing washer 8, and are aligned co-axially in reference to axis of rotation 6. Each of the axial bearings, with respectively only one needle 32 and a part of cage 33 being shown, abuts one track 31. Axial bearings 9 and 10 are each guided via their cages 33 radially at shaft 13, however, here they are rotational in reference to shaft 13 about axis of rotation 6.

Tracks 31 are hardened for the rolling contact with bearing washer 8. The material of structural element 7 is, e.g., a light metal alloy or an unhardened steel so that structural element 7 is softer at its surface than bearing washer 8, at least at tracks 31.

As discernible from FIG. 6, bearing washer 8 is inserted in opening 34 of structural element 7 and encased by the rim of opening 34 at its external cylindrical area 35. This way, bearing washer 8 is radially supported in area 35 inside opening 34, i.e., in the directions perpendicular to axis of rotation 6.

From FIG. 1 it is discernible that section 36 of structural element 7 at the rim of opening 34, at which bearing washer 8 is radially supported in structural element 7, shows axial thickness $W_2$, which is smaller than axial thickness $W_1$ of another section 37 of structural element 7, which radially follows section 36. Thickness $W_2$ of section 36 is equivalent to thickness $W_3$ of bearing washer 8.

Bearing washer 8 is fastened at structural element 7 by a rivet connection using rivets 12. The rivet connection shows several rivets 12, with only one being shown in FIG. 1 and two in FIG. 6, distributed evenly about axis of rotation 6 in the circumferential direction. Each of the individual connections is formed by rivet 12 and by penetrating hole 38. Penetrating hole 38 is limited by semi-spherically embodied section 38a of penetrating hole 38, at the inside, and by semi-spherically embodied section 38b, which is recessed radially inwardly in area 35. Semi-spherical sections 38a and 38b are separated from each other in the radial direction by gap 40, at which structural element 7 and bearing washer 8 abut. Respective head 12a of rivet 12 is therefore at the circumference encompassed by structural element 7 and bearing washer 8 in the respective penetrating hole 38.

As discernible from FIG. 1, structural element 7 and bearing washer 8 are each axially engaged from behind by heads 12b and 12c of respective rivet 12. Respective head 12b and/or 12c here axially abuts the two structural parts in a radial level, which extends in the radial level of tracks 31 perpendicular in reference to axis of rotation 6.

In FIG. 7 an alternative connection is shown of elements 7 and 8, which therefore are marked as structural elements 7' and bearing washer 8', although otherwise the description regarding FIG. 1 can also be applied for this arrangement as well. Bearing washer 8' is supported in a form-fitting fashion in the circumferential direction about axis of rotation 6 in structural element 7' between rivets 12. For this purpose, bearing washer 8' shows at the exterior partially radial protrusions 22, for example, in the form of splines. In the opening structural element 7' is provided with radial recesses 41, which correspond with regards to their number, position, and shape to protrusions 22. Bearing washer 8' is secured via the form-fitting connection of protrusions 22 with recesses 41 against any rotation about axis of rotation 6 in reference to the structural part.

Figure 2:
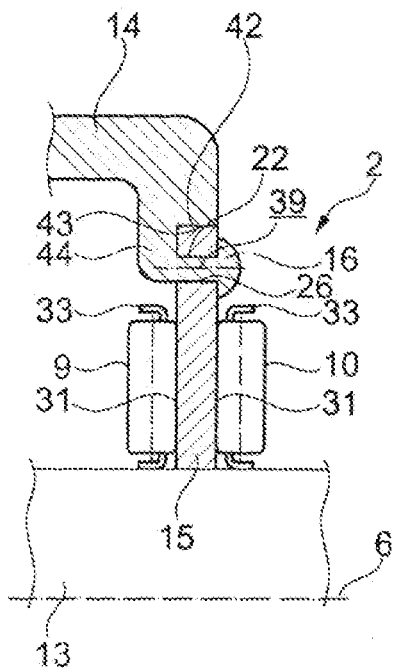
FIG. 2 is a detail of one exemplary embodiment of a bearing support point.

FIG. 2 shows bearing support point 2, in which bearing washer 15 is held axially at structural element 14 via several non-detachable, form-fitting connections 39. Bearing washer 15 is provided with two tracks 31, aligned away from each other. Axial bearings 9 and 10 are located axially opposite each other at bearing washer 15 and are co-axially aligned with axis of rotation 6. Each of axial bearings 9 and 10, with only one needle 32 and a part of cage 33 being illustrated, abuts one of the tracks 31. Axial bearings 9 and 10 are each guided via their cages 33 radially at shaft 13, however, here they are rotational in reference to shaft 13 about axis of rotation 6.

Tracks 31 are hardened for the rolling contact with bearing washer 8. The material of structural element 14 is, e.g., a light metal alloy or an unannealed steel, so that structural element 14 is softer at the surface than bearing washer 15, at least at tracks 31.

Bearing washer 15 is inserted in opening 42 of structural element 14 and encased at the exterior by the rim of opening 42 at its external cylindrical area 43. This way, bearing washer 15 is supported via area 43 radially inside in opening 42, i.e., in the directions perpendicular to axis of rotation 6 of the shaft.

Permanent axial connection 39 of bearing washer 15 with structural element 14 is generated by the clinching (clinch riveting) and is designed as described in the following. For this purpose, circumferential collar 44 follows bearing washer 15 radially into opening 42, at which bearing washer 15 is axially supported in a direction equivalent to the one of axis of rotation 6. Several protrusions 22, evenly distributed over the circumference of shaft 13, project axially from collar 44. Only one protrusion 22 is illustrated in FIG. 2. Respective protrusion 22 projects axially through penetrating hole 26 in bearing washer 15 and extends beyond it. End 16 of the protrusion, projecting from penetrating hole 26, is produced by way of plastic deformation after passing protrusion 22 through respective penetrating hole 26 and is shaped like a rivet head or alternatively also formed in any arbitrary shape. End 16 engages axially behind bearing washer 15.

Figure 3:
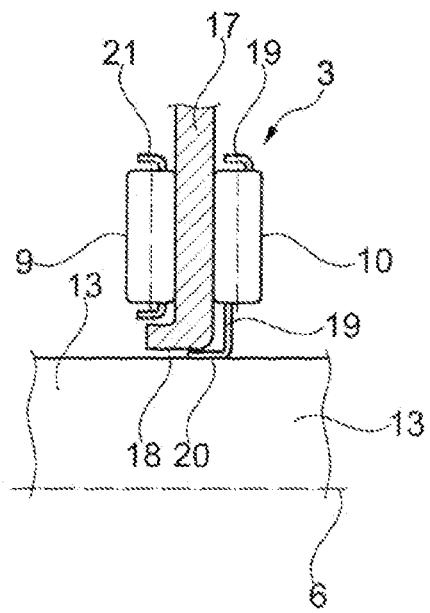
FIG. 3 is a detail of one exemplary embodiment of a bearing support point.

FIG. 3 shows a detail of bearing support point 3, with essentially the description of bearing support points 1 and 2 being respectively applicable as described regarding FIGS. 1 and 2. Unlike bearing support points 1 and 2, bearing support point 3 shows bearing washer 17, which at its interior is provided with flange 18 aligned axially inwardly. Furthermore, axial bearing 9 is equipped with cage 21 and axial bearing 10 with cage 19. Cage 19 is provided with flange 20 and engages with flange 20 radially behind flange 18 of bearing washer 17, at least partially. This way, axial bearing 10 is radially guided at bearing washer 17. Alternatively, axial bearing 10 is radially guided via cage 19 at shaft 13. Furthermore, axial bearing 9 is radially guided with the help of cage 21 at the other side of flange 18. For example, it is possible that an arbitrary structural element 7 or 14, connected to bearing washer 17, is supported rotationally at both sides axially at axial bearings 9 and 10.

Figure 4:
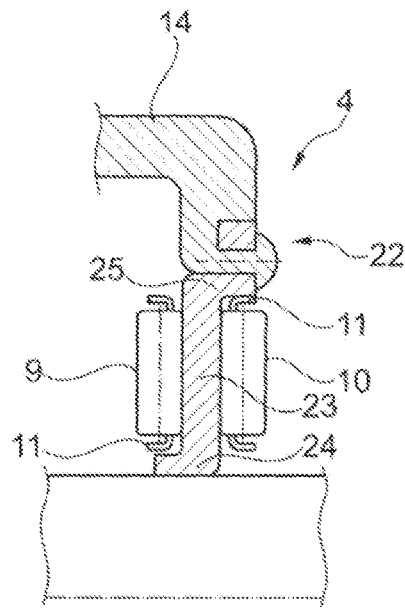
FIG. 4 is a detail of one exemplary embodiment of a bearing support point.

FIG. 4 shows a detail of bearing support point 4, with essentially the description of bearing support point 2 described in FIG. 2 being applicable, here. Unlike bearing support points 2, bearing support point 3 comprises at bearing washer 23 at the inside axially aligned flange 24, which is connected fixed to shaft 13. Furthermore, in the longitudinal cross-section bearing washer 23 is provided at the connection to structural element 14 with crank 25 and is additionally radially supported in structural element 14. Axial bearing 9 is (supported) via its cage 11 radially inside at flange 24 and axial bearing 10 via its cage 11 at the outside at crank 25.

Figure 5:
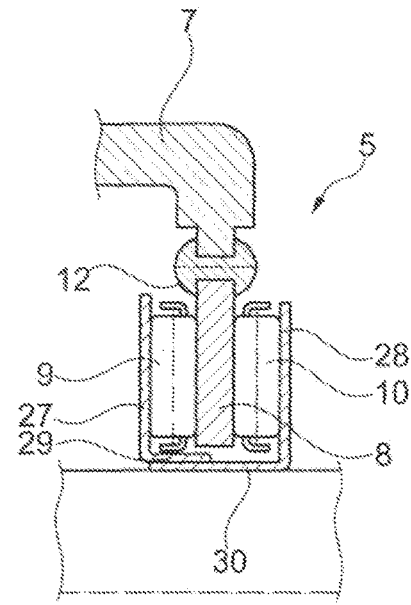
FIG. 5 is a detail of one exemplary embodiment of a bearing support point.

FIG. 5 shows a detail of bearing support point 5, with essentially the description of bearing support point 1 described with FIG. 1 being applicable, here. Unlike bearing support point 1, FIG. 5 show not only bearing support point 8 and axial bearings 9 and 10, but also a structural unit comprising bearing disk 8, axial bearings 9 and 10, and disks 27 and 28. Disks 27 and 28 are also called axial washers and arranged at the right and/or the left of bearing 9 and/or 10. Axial washer 28 comprises axially aligned flange 30 with shaft 13 resting therein. Axial washer 27 is supported radially via flange 29 on axial washer 28.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

1 Bearing support point
2 Bearing support point
3 Bearing support point
4 Bearing support point
5 Bearing support point
6 Axis of rotation
7, 7' Structural element
8, 8' Bearing washer
9 Axial bearing
10 Axial bearing
11 Cage
12 Rivet
12a Head of the rivet
12b Head of the rivet
12c Head of the rivet
13 Shaft
14 Structural element
15 Bearing washer
16 End
17 Bearing washer
18 Flange
19 Cage
20 Flange
21 Cage
22 Protrusion
23 Bearing washer
24 Flange
25 Crank
26 Penetrating hole
27 Running disk/axial disk
28 Running disk/axial disk
29 Flange
30 Flange
31 Track
32 Needle
33 Cage
34 Opening
35 Exterior cylindrical area
36 Section of the structural element
37 Section of the structural element
38 Penetrating hole
38a Section of the penetrating hole
38b Section of the penetrating hole
39 Form-fitting connection
40 Gap
41 Recess
42 Opening
43 Area
44 Collar

What is claimed is:

1. A bearing support point with at least one axial bearing, comprising:
a structural element having an opening; and,
at least one bearing washer formed separately from the structural element and fastened at the structural element, the at least one bearing washer comprising a first track facing a first axial direction for the at least one axial bearing wherein:
the bearing washer is inserted in the opening of the structural element such that the structural element encases an exterior area of the at least one bearing washer and the bearing washer is supported via the exterior area; and,
the first track includes a first surface made of a first material having a first surface hardness and the structural element, at least at the opening, includes a second surface made of a second material having a second surface hardness and the first surface hardness is greater than the second surface hardness.

2. The bearing support point recited in claim 1, comprising the at least one axial bearing is two axial bearings, in which the axial bearings are located axially opposite each other at the first track facing the first axial direction and a second track facing a second axial direction, opposite the first axial direction, respectively, of the bearing washer and are respectively supported axially at the first or the second track.

3. The bearing support point recited in claim 2, wherein the structural element is supported axially via the two axial bearings in a rotational fashion about an axis of rotation.

4. The bearing support point recited in claim 1, wherein the structural element is supported at least at a brim of the opening, at which the bearing washer is radially supported in the structural element, and the structural element includes a first axial thickness and a second axial thickness radially following the first axial thickness.

5. The bearing support point recited in claim 4, wherein the first axial thickness is equivalent to an axial thickness of the bearing washer at least where the bearing washer is radially supported on the structural element.

6. The bearing support point recited in claim 1, wherein the structural element is supported at least at a brim of the opening, at which the bearing washer is radially supported in the structural element, and the structural element includes a first axial thickness, which is equivalent to a second axial thickness, with the bearing washer including the second axial thickness at least where the bearing washer is radially supported on the structural element.

7. The bearing support point recited in claim 1, wherein the structural element and the bearing washer are axially connected to each other by at least one permanent form-fitting connection.

8. The bearing support point recited in claim 1, wherein the structural element is connected to the bearing washer by at least one rivet connection.

9. The bearing support point recited in claim 1, wherein the bearing washer is supported in a form-fitting fashion in the structural element.

10. The bearing support point recited in claim 1, wherein the structural element is connected to the bearing washer by several rivet connections arranged at the opening at a distance from each other and the bearing washer engages the structural element in a form-fitting fashion between the rivet connections.

\* \* \* \* \*